United States Patent [19]
Sasaki

[11] Patent Number: 5,649,250
[45] Date of Patent: Jul. 15, 1997

[54] IMAGE RECORDING AND REPRODUCING SYSTEM

[75] Inventor: Gen Sasaki, Toyonaka, Japan

[73] Assignee: Minolta Co., Ltd., Osaka, Japan

[21] Appl. No.: 469,467

[22] Filed: Jun. 6, 1995

[30] Foreign Application Priority Data

Jun. 9, 1994 [JP] Japan ..................... 6-127366

[51] Int. Cl.$^6$ ................................... G03B 35/08
[52] U.S. Cl. ........................................ 396/333
[58] Field of Search ........................ 354/110, 114, 354/75, 76

[56] References Cited

U.S. PATENT DOCUMENTS 3,178,993  4/1965  Ferris et al. ................... 88/1
3,532,038  10/1970  Rottman ........................ 95/18
4,175,844  11/1979  Glaser-Inbari ................ 354/110

FOREIGN PATENT DOCUMENTS

HS-2208  1/1993  Japan .

*Primary Examiner*—David M. Gray
*Attorney, Agent, or Firm*—Sidley & Austin

[57] ABSTRACT

A subject is photographed by a camera provided with a multi-micro lens including a plurality of lenses to form a plurality of images on the film, so that the optical length is greatly reduced. The developed multi-image on the film is electrically read out by a reading unit of the image reproducing apparatus to reproduce a single image by averaging corresponding pixels of all the images and the reproduced image is outputted through a monitor and a display, so that a clear image is reproduced irrespective of the graininess of the film.

18 Claims, 14 Drawing Sheets

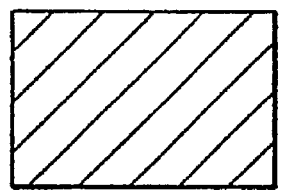
FIG.19A
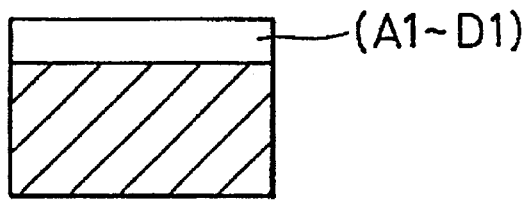
FIG.19B  (A1~D1)
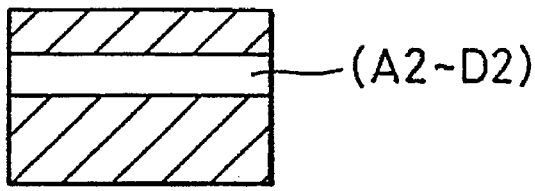
FIG.19C  (A2~D2)
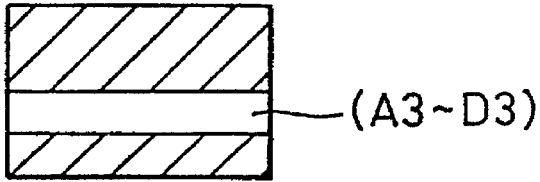
FIG.19D  (A3~D3)
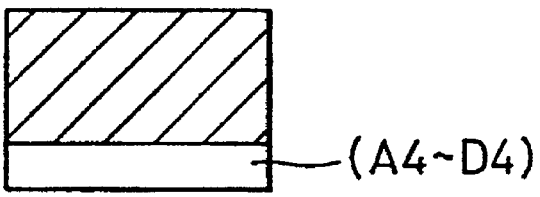
FIG.19E  (A4~D4)
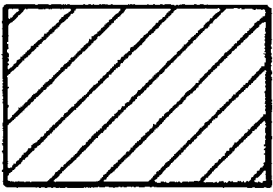
FIG.19F

IMAGE RECORDING AND REPRODUCING SYSTEM

BACKGROUND OF THE INVENTION

1. Field of the Invention

The present invention relates to an image recording and reproducing system which records a plurality of substantially the same images on film and reproduces the plurality of images into a single image.

2. Description of the Prior Art

In recent years, cameras have remarkably been reduced in size, and with the size reduction, compact cameras are rapidly spreading among ordinary users. Under such circumstances, disposable cameras have been put to practical use. Although slightly inferior in performance of the lens, the optical system of the camera of such a type is basically equivalent to the optical system of the normal camera in that images are focused on film by a single lens unit.

Moreover, some of the conventional image recorders such as cameras and the like are designed to record a plurality of images. For example, the following systems are known: firstly, a stereo type which exposes two images with a parallax therebetween on film by using two lenses arranged in parallel to realize a three-dimensional image by producing two images for the right eye and the left eye, respectively; secondly, a camera for continuous photography which performs continuous photographing to produce a plurality of images which are not the same but different in time; and thirdly, a camera for taking photographs for identification cards, drivers licenses, passports, etc. which produces images completely different in time.

However, in any of the above-mentioned conventional systems, although some have succeeded in reducing the longitudinal and lateral dimensions of the systems with various ideas, no satisfactory results have been obtained with respect to the reduction in thickness associated with the optical system.

Specifically, in the first system of the type which produces a plurality of images, since this system is intended to produce two images for the left and right eyes in view of the parallax and not to produce a single image, the reduction in thickness of the system cannot be realized with a small number of lenses such as two lenses. In the second system of the continuous photography type, since it is a plurality of images that are finally obtained and the image is merely divided in a lateral direction, the reduction in thickness cannot be realized, either. In the third apparatus, it is a plurality of images that are finally obtained and the camera for taking photographs for identification cards, etc. takes a total of approximately four pictures of 2×2. However, with such a number of pictures, the realization in thickness reduction is hardly expected.

This is because, since the above-described conventional recording systems are each provided with an optical system for exposing one image on the entire area of one frame of the film, it is physically impossible to reduce the length of the optical system necessary for focusing the image on the film.

Referring to FIG. 1, there is shown an optical system common to the above-described conventional systems. As is apparent from this figure, in photographing a subject S with these conventional systems, since a single image (subject image) Si is formed on a film F by a single image forming lens (including lens units) 21, a size $SI_0$ of the image formed on the film surface is substantially the same as the entire area of the film surface, so that an optical length $L_0$ from the lens 21 to the film surface is inevitably long.

Thus, in the case of the conventional systems, for example when a 135 mm film is used, it is necessary for the thickness of the exposing apparatus to be at least 30 mm, and it is practically impossible to produce a recording and reproducing system, an image reproducing apparatus and a camera having an exposing apparatus with a smaller thickness.

SUMMARY OF THE INVENTION

An object of the present invention is to realize a very thin camera.

Another object of the present invention is to provide an image recording and reproducing system, an image reproducing apparatus and a camera which realize an improvement of the qualities of reproduced images such as printed images and monitor images obtained by processing film images photographed by the very thin camera.

To achieve the above-mentioned objects, an image recording and reproducing system of the present invention is provided with a recording device which records an image of an object on a recording medium, and a reproducing device which reproduces a picture of the object based on the image recorded on the recording medium. The recording device includes a plurality of taking lenses, each of which has the same field of view and takes the same objective field as the others, and recording means for recording a plurality of images formed by said plurality of taking lenses on the recording medium. The reproducing device includes pick up means for picking up the plurality of images recorded on the recording medium, and converting means for converting the plurality of images picked up by said pick up means into a picture of the object to be reproduced.

BRIEF DESCRIPTION OF THE DRAWINGS

This and other objects and features of this invention will become clear from the following description, taken in conjunction with the preferred embodiments with reference to the accompanied drawings in which:

FIGS. 19A to 19F are schematic views of assistance in explaining an operation of an LCD shutter in sequence;

DESCRIPTION OF THE PREFERRED EMBODIMENTS

Figure 2:
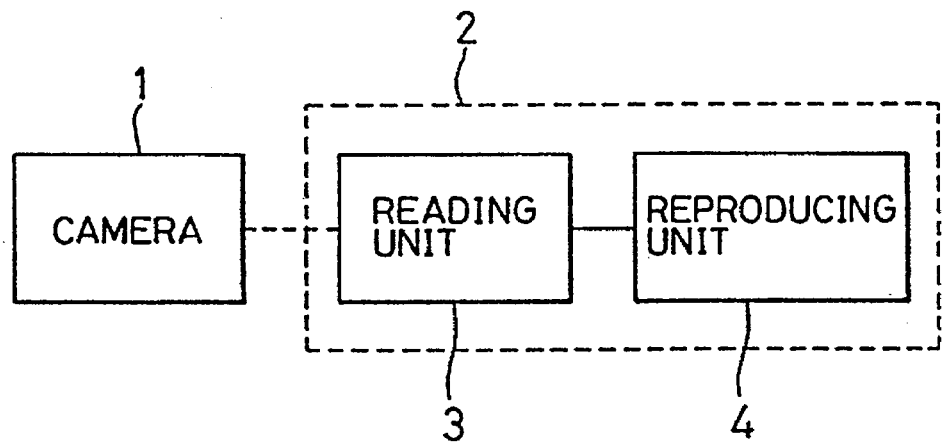
FIG. 2 is a block diagram schematically showing the arrangement of an image recording and reproducing system embodying the present invention.

Hereinafter, an embodiment where the present invention is employed for an image recording and reproducing system will be described with reference to the drawings. As shown in FIG. 2, the image recording and reproducing system according to this embodiment includes a camera 1 serving as an exposing apparatus and an image reproducing apparatus 2 which reproduces images photographed by the camera 1. The image reproducing apparatus 2 is provided with a reading unit 3 which reads out images (subject images) on the film by an electrical means and a reproducing unit 4 which reproduces image signals read out by the reading unit 3.

Figure 3:
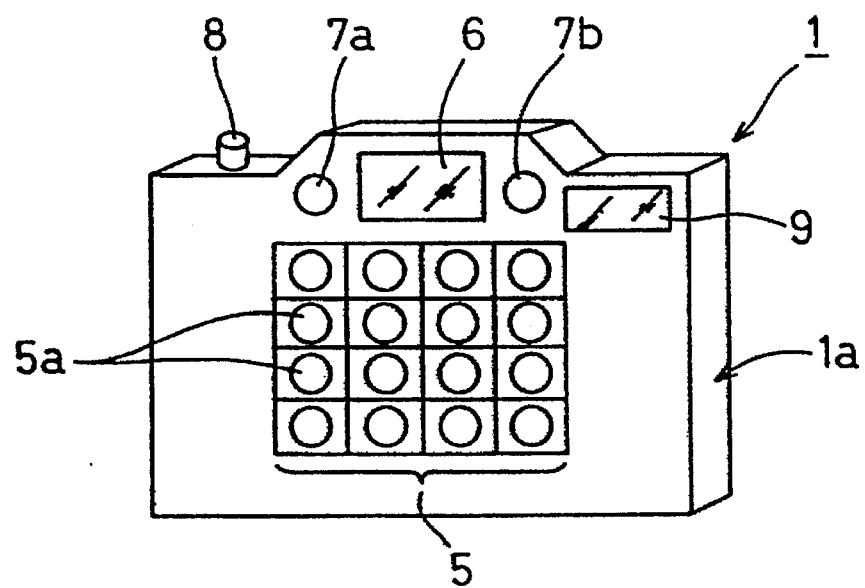
FIG. 3 is a perspective view schematically showing a camera embodying the present invention.

Referring to FIG. 3, there is shown the appearance of the camera 1. The camera 1 shown in this figure is a so-called AF (automatic focusing) camera incorporating an automatic focusing function and an automatic photometry function to automatically measure the distance to the subject by using infrared light. A camera body 1a is provided with a multi-micro lens system 5 including a plurality of lenses 5a, a finder 6, an AF infrared light emitting window 7a, an AF infrared light receiving window 7b, a release button 8 and a strobe-type light emitter 9. The arrangement of this camera is the same as the arrangements of conventional AF cameras in that, when the release button 8 is depressed, the photometry and focusing functions operate and the light emitter 9 is activated as needed. However, the exposure function is different from the conventional camera.

Figure 4:
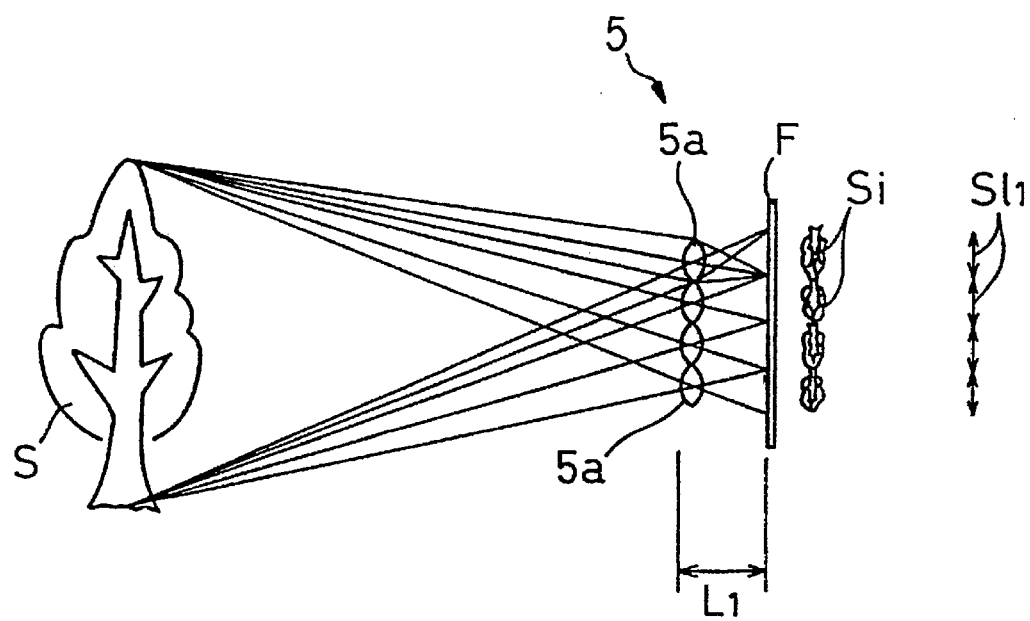
FIG. 4 is a schematic view of assistance in explaining the optical length of an optical system of the embodiment of the present invention.

Referring to FIG. 4, there is schematically shown an optical system in this embodiment. In this embodiment, the shown multi-micro lens system 5 shown in the figure includes a total of 16 lenses 5a arranged in a 4×4 matrix, so that when the subject S is photographed, a plurality of images Si are formed on the film F by a plurality of lenses 5a each having a short focal length. The plurality of lenses 5a are disposed in a plane perpendicular to an optical axis of the lenses 5a so as to form a plurality of images on a predetermined plane on the film F.

Figure 1:
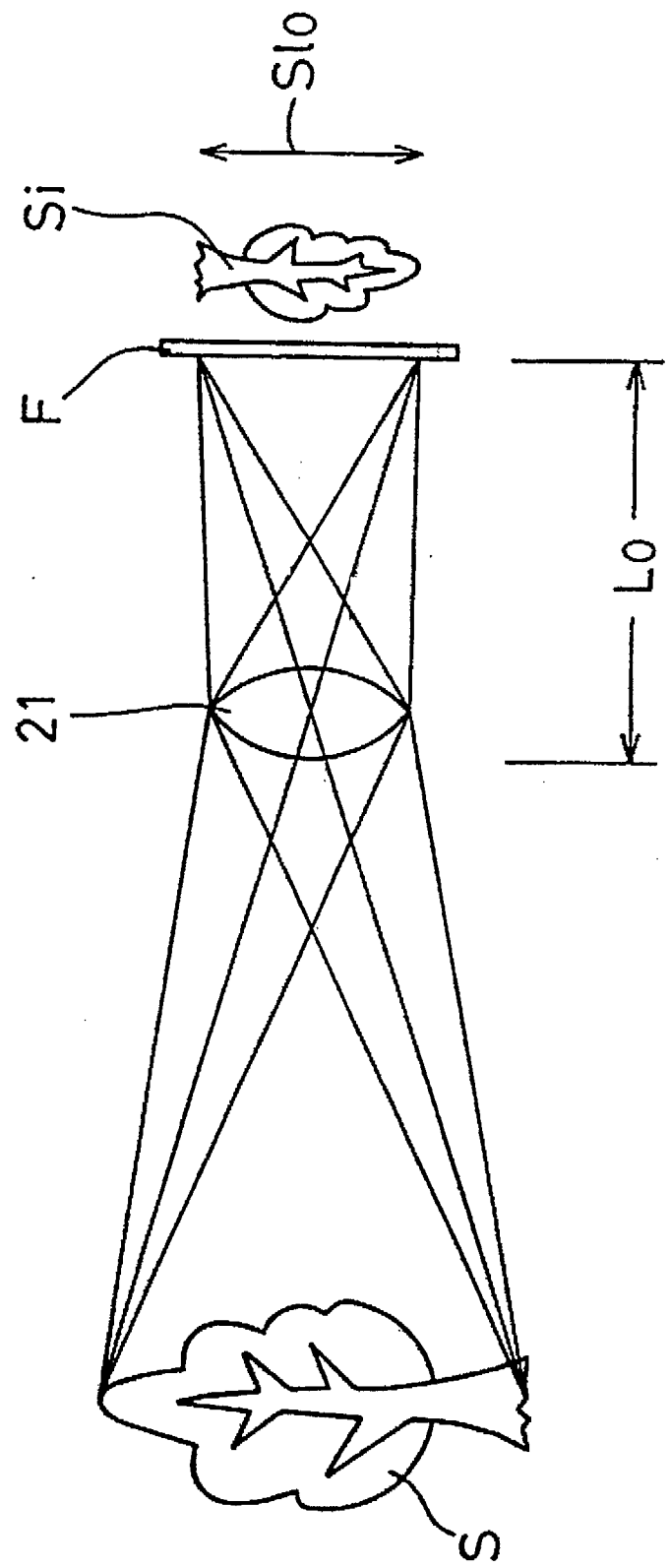
FIG. 1 is a schematic view of assistance in explaining the optical length of a conventional optical system.

Consequently, the optical length $L_1$ from the lenses 5a to the film surface is largely reduced compared to the conventional system shown in FIG. 1. As a result, the reduction in thickness of the camera is realized. $S1_1$ represents the size of each image, which is one-fourth the image size $S1_0$ of FIG. 1.

Figure 5:
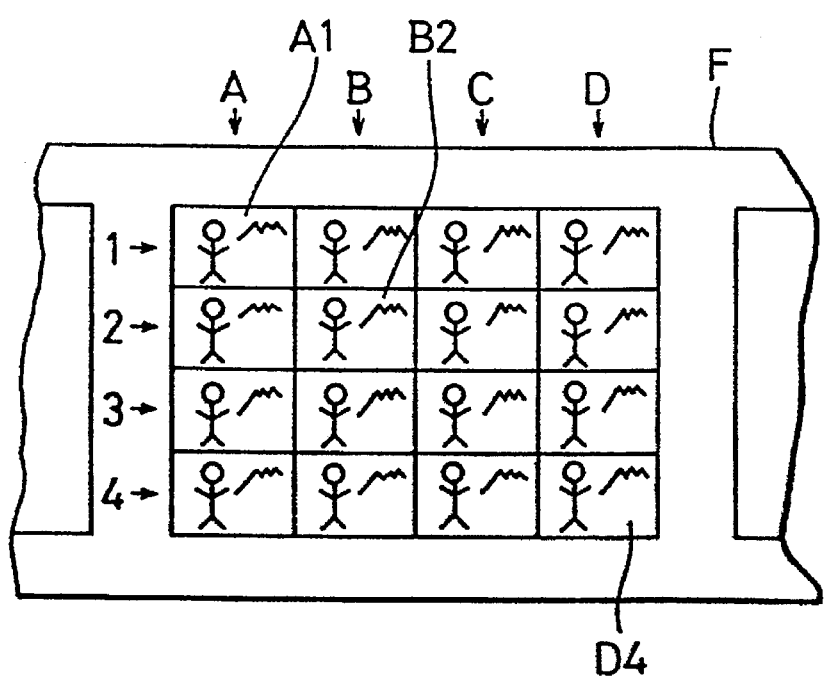
FIG. 5 shows an example of an image on the film which is developed after having been exposed by the camera.

Referring to FIG. 5, there is shown an example of images formed on the film F exposed by the camera 1 structured as described above and developed. As shown in this figure, images exposed by the lenses 5a of the 4×4 multi-micro lens system 5 are developed on the film F.

Hereinafter, the set of images will be called a multi-image, and the positions of the images will be shown by coordinates such as A1, B2, . . . set on the film where the positions in the lateral rows (in the Y direction) are shown by 1 to 4 and the positions in the longitudinal rows (in the X direction), by A to D.

Figure 6:
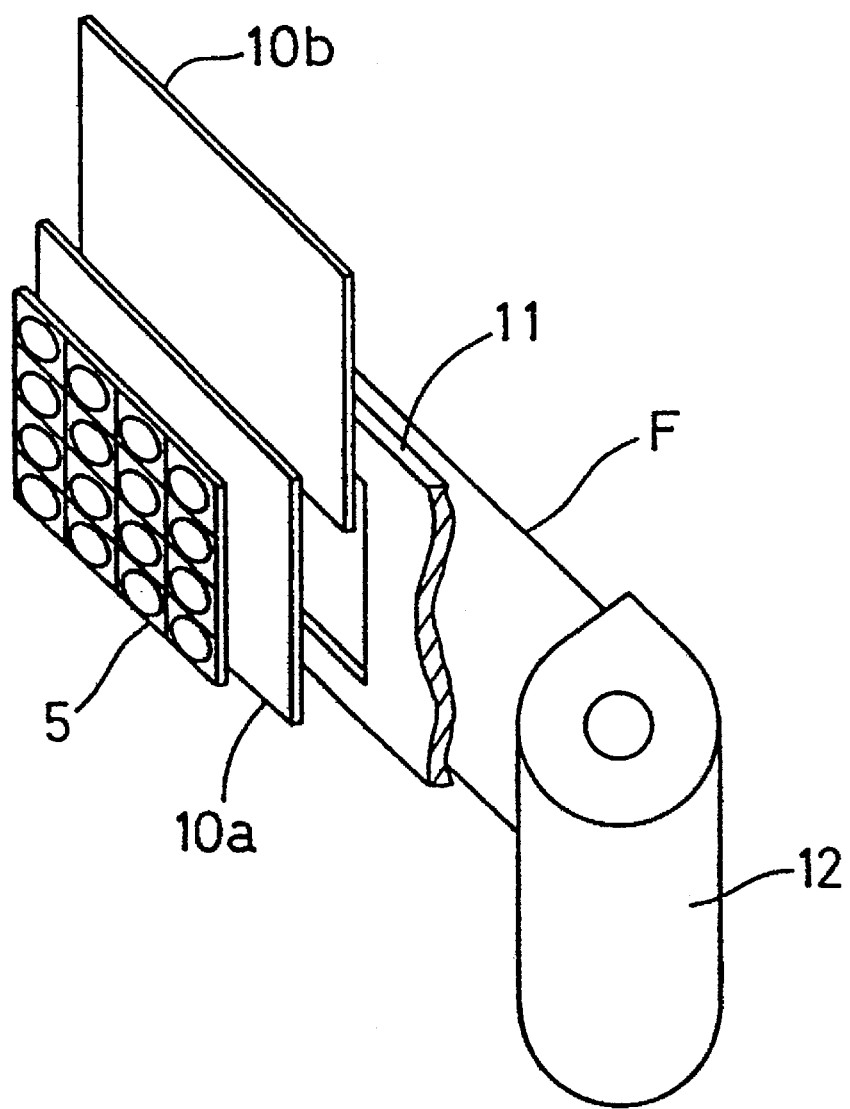
FIG. 6 is a perspective view schematically showing the arrangement of a relevant portion of an exposure optical system provided in the camera.

Referring to FIG. 6, there is shown an exposure optical system of the camera 1. Reference designations 10a and 10b represent two shutter films provided behind the multi-micro lens system 5. Reference numeral 11 represents a light intercepting member arranged between the film F and the shutter films 10a and 10b for partitioning the film F into frames in correspondence with the transportation pitch of the film F. Reference numeral 12 represents a film cartridge.

Referring to FIGS. 7A to 7F, the timing of exposure by the workings of the shutter films 10a and 10b is shown in sequence. As shown in this figure, in this embodiment, the 4×4 multi-images taken on the film F are divided into four groups which are exposed at slightly staggered exposure timings.

Figure 7:
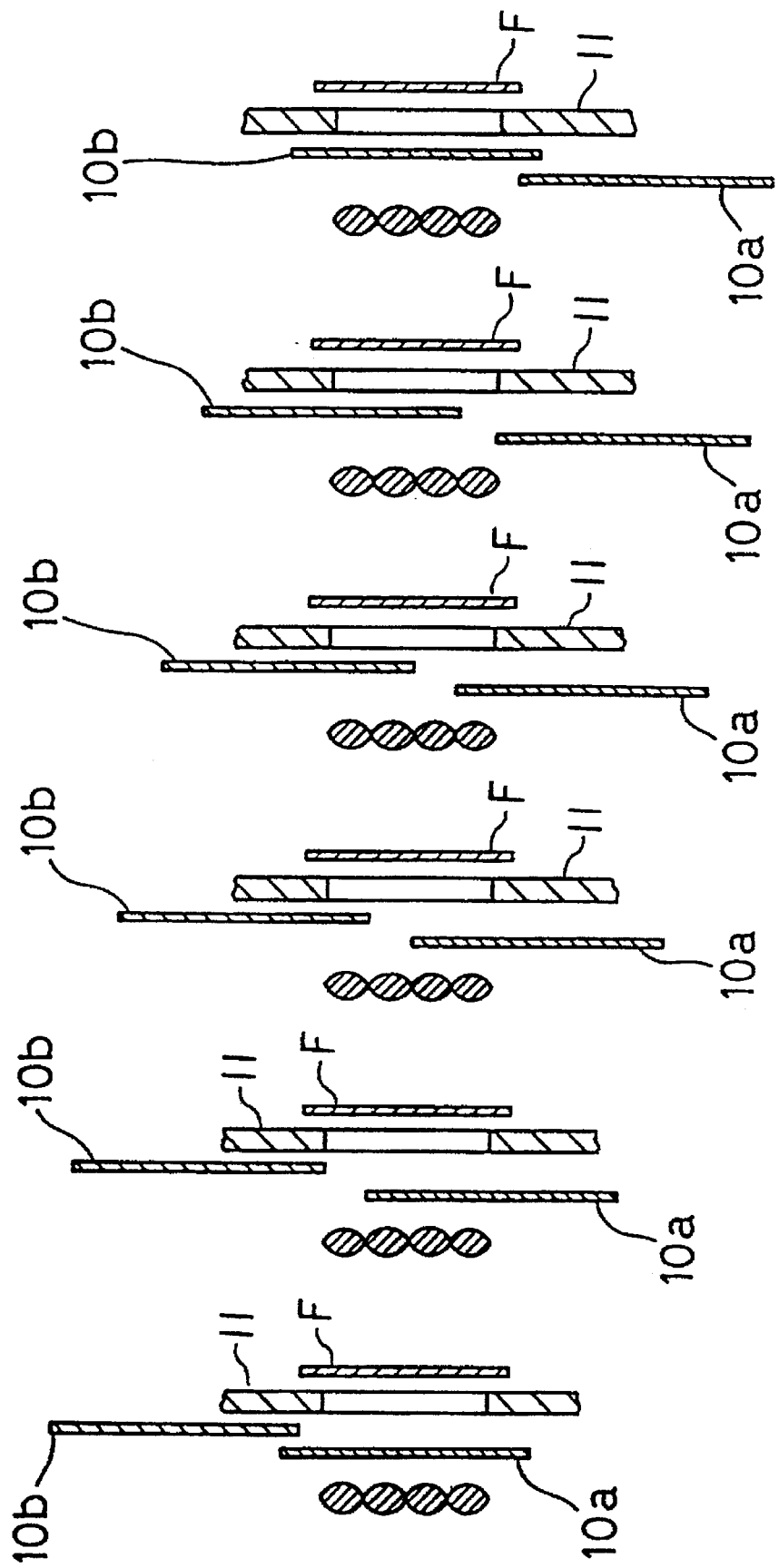
FIGS. 7A to 7F are cross-sectional views of a relevant portion for showing the exposure timing in sequence.

Specifically, when the release button 8 is depressed under a condition where the film surface is screened by the lower shutter film 10a as shown in FIG. 7A, first, as shown in FIG. 7B, the lower shutter film 10a descends by an amount corresponding to the lenses 5a in the first longitudinal row shown in FIG. 5, and then, as shown in FIG. 7C, the upper and lower shutter films 10a and 10b descend while maintaining an opening corresponding to one longitudinal row of the lenses 5a to expose a portion corresponding to the lenses 5a in the second longitudinal row. Subsequently, as shown in FIGS. 7D and 7E, the third and fourth longitudinal rows are exposed in a similar manner, and as shown in FIG. 7F, the film surface is screened by the upper shutter film 10b.

After having been exposed by the camera 1, the film F, developed as shown in FIG. 5, is mounted in the reading unit 3 so that the multi-image of each frame is reproduced by being electrically converted into a single image.

Figure 8:
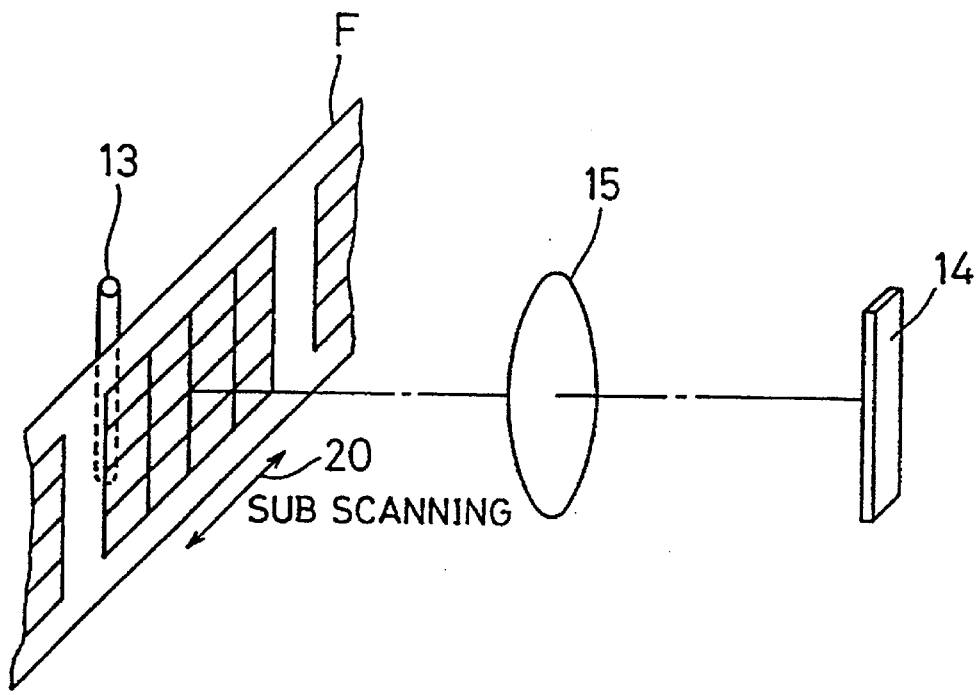
FIG. 8 is a perspective view schematically showing an electrically reading optical system in a reading unit.

Referring to FIG. 8, there is schematically shown the arrangement of the reading unit 3 of the image reproducing apparatus 2. The reading unit 3 includes an illuminating lamp 13 which irradiates illuminating light to the film F from behind, a CCD (charge coupled device) line sensor 14, and an image forming lens 15 arranged between the CCD line sensor 14, and the film F and the illuminating lamp 13. While irradiated by the illuminating lamp 13, the film F is moved by a non-illustrated moving means in the direction (sub-scanning direction) shown by the arrow 20 so that an equal distance is maintained with the CCD line sensor 14 at a point where the film F faces the CCD line sensor 14. The multi-image on the film F is read out by the CCD line sensor 14 in the sub scanning of the film F.

The film F may be held at a fixed position so that the illuminating lamp 13, the image forming lens 15 and the CCD line sensor 14 are moved. Alternately, an area image sensor capable of reading out the film surface frame by frame may be used instead of the line sensor 14 so that the film F, the illuminating lamp 13, the lens 15 and the sensor 14 may be all held at fixed positions.

The reproducing unit 4 of the image reproducing apparatus 2 processes image signals read out by the reading unit 3 to reproduce a single image like the conventional systems.

By connecting the reproducing unit 4 to a display (not shown) such as a monitor and a printer, the reproduced image is viewed.

As is apparent from FIG. 4, the greater the number of images included in the nxm multi-image, the smaller the size of each image, and then, the thickness of the camera 1 is further reduced. However, the smaller the size of the images is, the less the graininess of the film F can be ignored.

Figure 9:
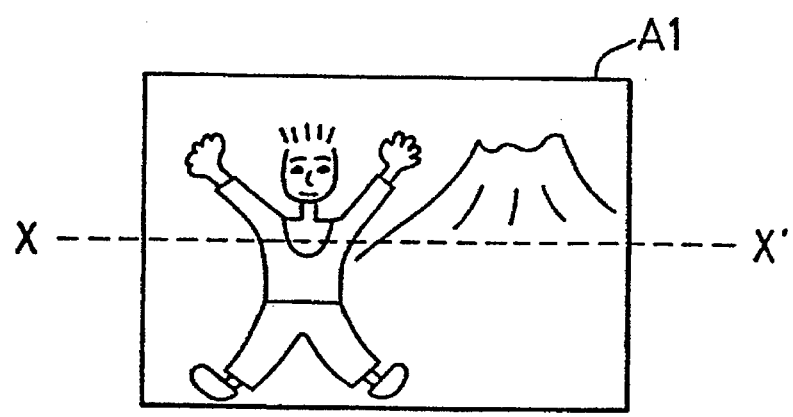
FIG. 9 is an enlarged view of an image A1 shown in FIG. 5.
Figure 10:
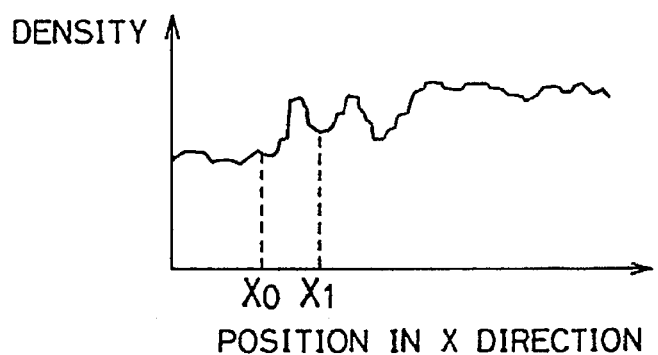
FIG. 10 is a diagram showing the density variation at line X—X' of FIG. 9.
Figure 11:
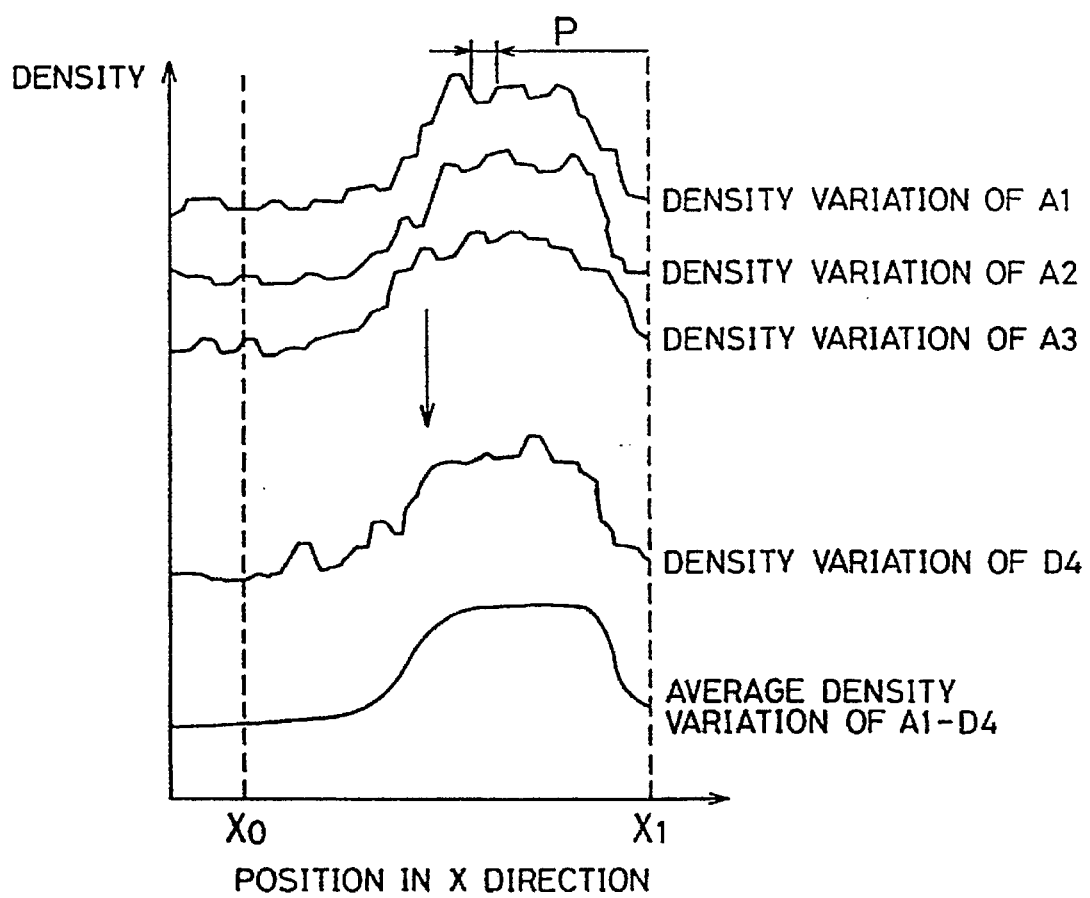
FIG. 11 is a diagram showing the density variations of the images A1 to D4 corresponding to the line $X_0$–$X_1$ of FIG. 10 and the density variation of an image obtained by averaging all the images.

This will be described with a specific example shown in FIGS. 9 to 11. In FIG. 9, the image A1 of FIG. 5 is shown being enlarged. The density profile of the image A1 of this figure presents a variation phase as shown in FIG. 10 at the line X–X'. FIG. 11 shows enlarged views of the density profiles of all the images A1 to D4 corresponding to the line $X_0$–$X_1$ of FIG. 10, and of the average density profile of all the images A1 to D4. As shown in FIG. 11, the resolutions of the images A1 to D4 are determined by a pitch P depending on the graininess of the film F, and it is apparent that the greater the grain size of the film F is, the lower the resolutions are.

The graininess of the film F is improved by using low sensitivity film. This is not a radical solution since the subject is limited. Therefore, to statistically cancel the graininess of the film F, the images of low resolution attributed to the graininess of the film F is accumulated and divided by the number of images constituting the multi-image, i.e. the arithmetical mean of the low resolution images is obtained, so that a resolution is obtained which is substantially equivalent to an original resolution obtained when one image is exposed on one frame of the film F. In this embodiment, the arrangement of the pixels constituting the CCD line sensor 14 is decided according to such an idea.

Figure 12:
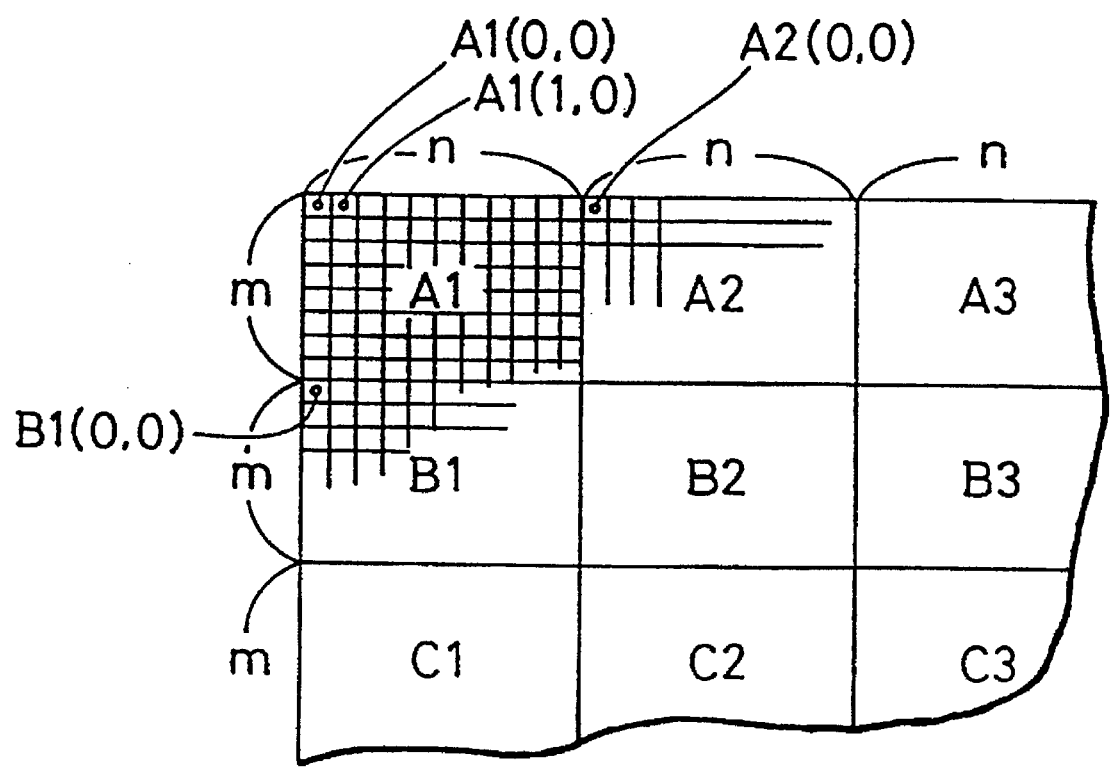
FIG. 12 shows an example of an arrangement of pixels.

Referring to FIG. 12, there is shown an example of an arrangement of the pixels for the case where the images are each read out by n×m pixels. The numerals in the parentheses of A1(1, 0), A2(0, 0), . . . show the positions of the pixels in the X and Y directions.

$$Y(X,Y) = \frac{A1(X,Y) + A2(X,Y) + \ldots + D3(X,Y) + D4(X,Y)}{16} \quad (1)$$

where Y is the average value of each pixel at the coordinates X and Y.

In the reproducing unit 4, as represented by the expression (1), for example in the case of 4×4, data read out by dividing all the images A1 to D4 into n×m pixels are averaged to thereby cancel the graininess of the film F. As a result, a single image data of high quality is reproduced. By displaying the data on a monitor such as a CRT (cathode ray tube) monitor or printing out the data through a printer connected to the reproducing unit 4, a high quality reproduced image is obtained.

Thus, in this embodiment, the multi-image on the film F is electrically read out by using a scanner designed to relatively move the film F and the CCD line sensor 4 which reads out the images on the film F, and the corresponding pixels of the images of the multi-image are averaged for all of the images to reproduce a single image and output the reproduced image on a monitor or through a printer, so that a clear image can be reproduced irrespective of the graininess of the film F. Further, the reproduced image can be printed onto photographic paper. In this case, since the average data of the multi-image has already been obtained, no printing lens is necessary.

In reading out the multi-image on the film F, when the film F is illuminated, if there is a non-uniformity among the lenses 5a constituting the multi-micro lens system 5, it is necessary to correct the non-uniformity. In this case, for example as shown in the flowchart of FIG. 13, a microcomputer provided in the reproducing unit 4 performs feature point extraction for each micro-image and corrects the magnification and position of each image to thereby obtain a high quality image data.

Figure 13:
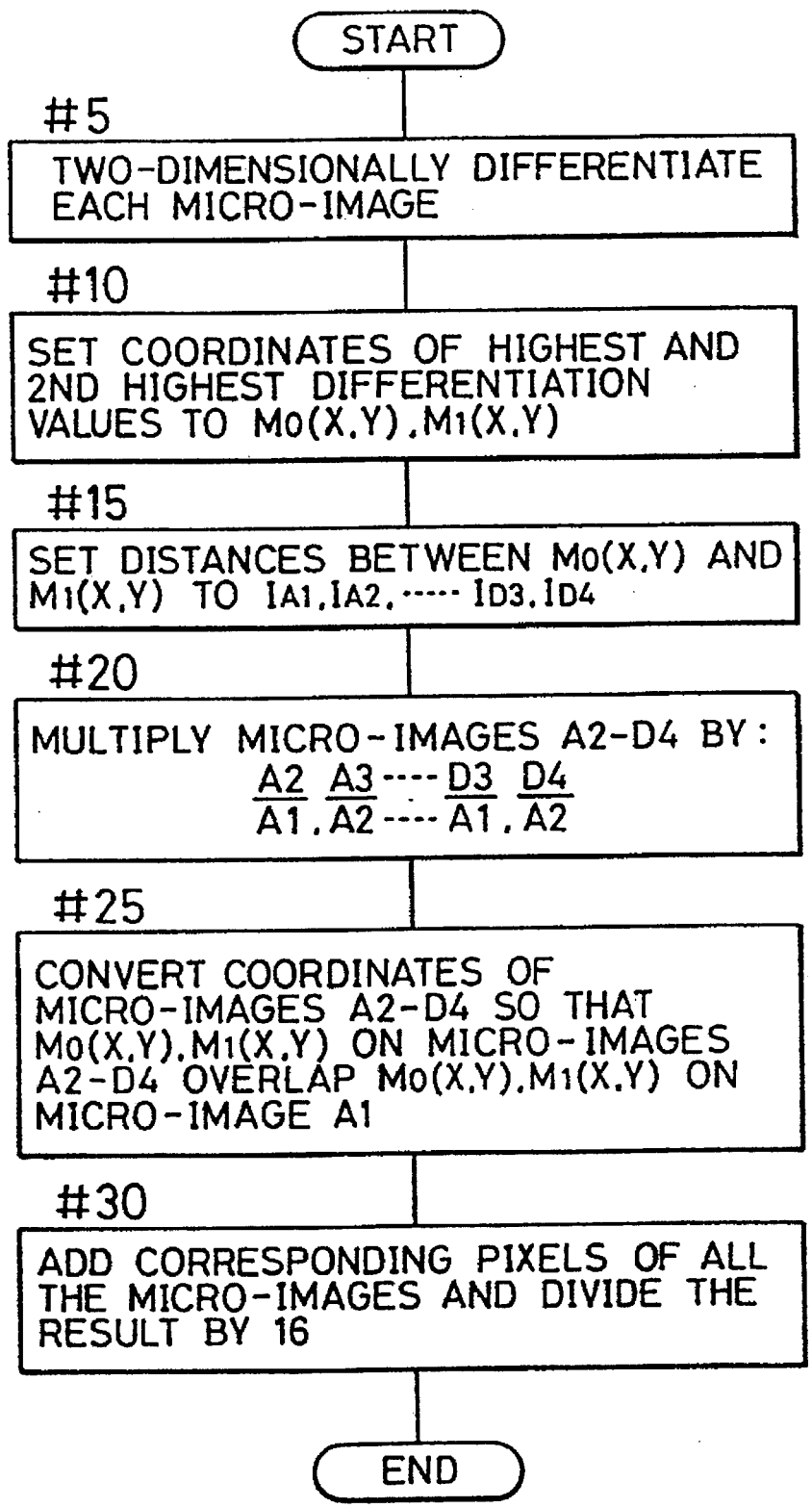
FIG. 13 is a flowchart showing an example of an algorithm for feature point extraction and image overlapping.

Specifically, referring to FIG. 13, at step #5, the micro-images are each two-dimensionally differentiated, and at step #10, the coordinates of the highest and the second highest values of the differentiation values are set to $M_0(X,Y)$ and $M_1(X,Y)$, respectively. Then, at step #15, the distance between two points $M_0(X,Y)$ and $M_1(X,Y)$ on the micro-images are each set to $1_{A1}, 1_{A2}, \ldots, 1_{D3}$ and $1_{D4}$, and at step #20, the images A2 to D4 are multiplied by magnifications (A2/A1), (A3/A2), . . . (D3/A1) and (D4/A2) corresponding to the images A2 to D4, respectively. Then, at step #25, the coordinates of the micro-images A2 to D4 are converted so that the points $M_0(X,Y)$ and $M_1(X,Y)$ on the images A2 to D4 overlap the points $M_0(X,Y)$ and $M_1(X,Y)$ on the image A1, and at step #30, the corresponding pixels of the micro-images are all added and the result is divided by 16.

Thus, in this embodiment, after the feature point extraction for each image is performed to correct the position differences in the X and Y directions and the errors in magnification, the corresponding pixels of all the images are averaged to reproduce a single image, so that the non-uniformity among the lenses is effectively corrected.

Figure 14:
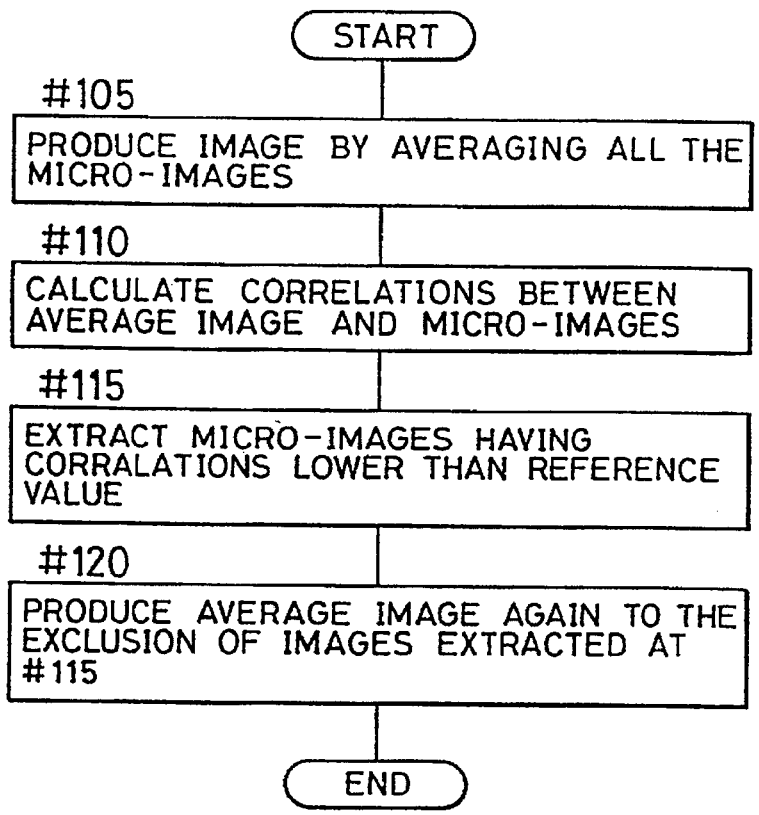
FIG. 14 is a flowchart showing an example of an algorithm for excepting low correlation images.

When the film F is partly flawed or dirty, for example as shown in the flowchart of FIG. 14, the microcomputer of the reproducing unit 4 averages the images to the exclusion of low correlation images, whereby high quality image data can be obtained which is not affected by the flaw or the dirt.

Specifically, referring to FIG. 14, at step #105, all the micro-images are averaged to produce an image, and at step #110, the correlations between the average image and the micro-images are calculated. Then, at step #115, micro-images having correlations lower than a reference level are extracted, and at step #120, an average image is again produced to the exclusion of the extracted micro-images.

Thus, in this embodiment, the correlation is calculated for each image and the corresponding pixels of the images are averaged to the exclusion of low correlation images to reproduce a single image, so that even if a specific image is flawed or dirty, the reproduced image is not affected by the flaw or the dirt.

Figure 15:
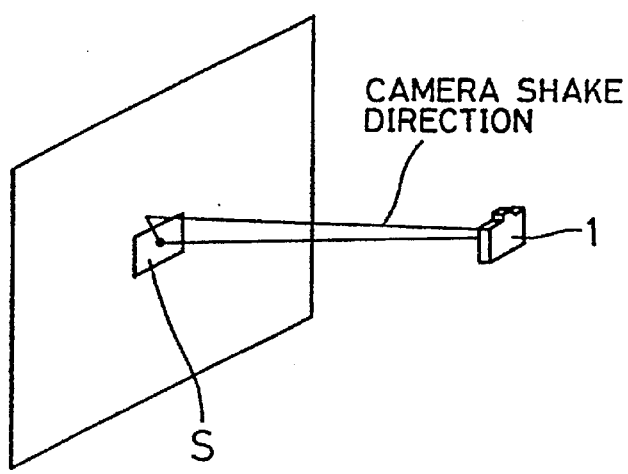
FIG. 15 schematically shows a relationship between a subject and the camera when camera shake occurs.
Figure 16:
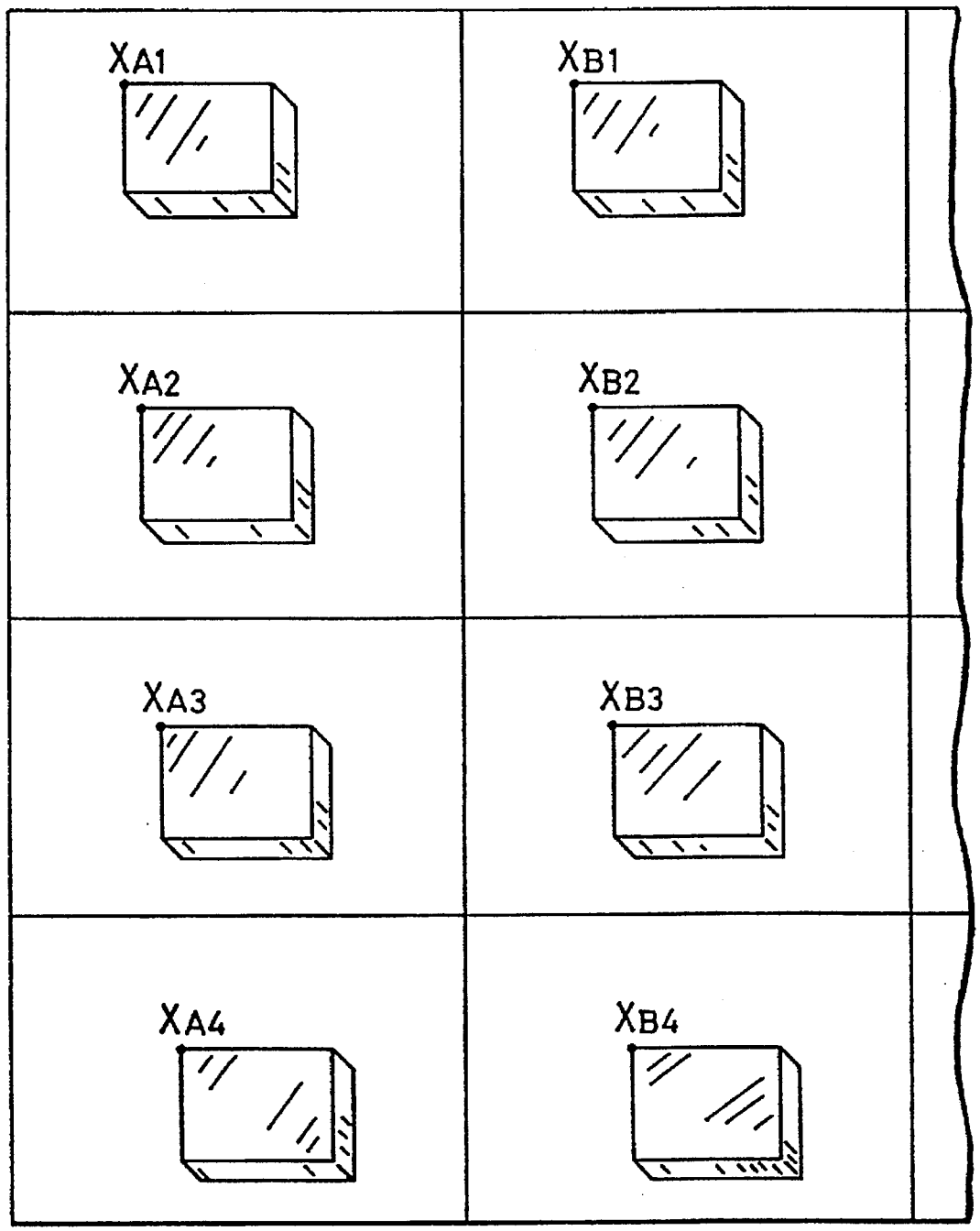
FIG. 16 shows a multi-image obtained when camera shake occurs.

FIG. 15 shows a relationship between the subject S and the camera 1 when camera shake occurs in photographing with the camera 1. FIG. 16 shows an example of a multi-image obtained when such camera shake occurs. In this example, the subject S which is originally square is photographed as a double image, and the positions of multi-images $X_{A1}$ to $X_{B4}$ obtained when the camera 1 shakes as shown in FIG. 15 are slightly different from one another as shown in FIG. 16.

Conventionally, to correct such position differences among the images due to camera shake, the camera 1 requires a sensor which detects the direction and amount of the camera shake, for example, as disclosed in Japanese Patent Application H4-349023.

Figure 17:
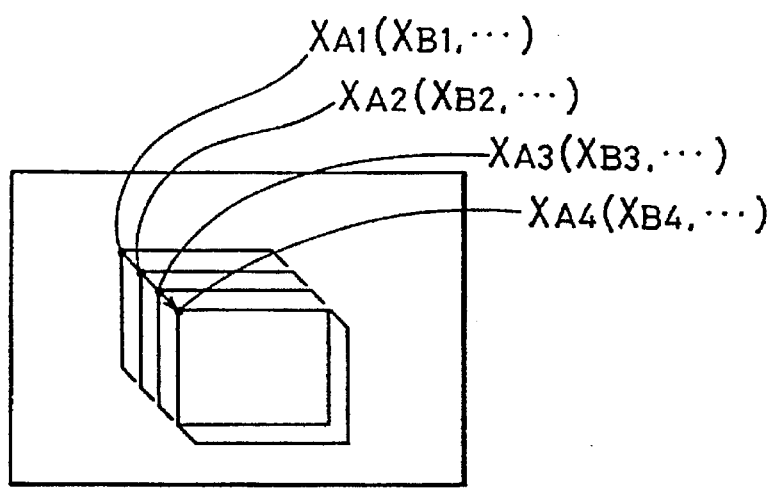
FIG. 17 schematically shows the direction of the camera shake on the film.

On the contrary, in this embodiment, the feature point extraction for the multi-images $X_{A1}$ to $X_{B4}$ is performed by the microcomputer of the reproducing unit 4 and the coordinates thereof are arranged to overlap one another as shown in FIG. 17, thereby determining the direction of the shake of the camera 1 and the amount of the position differences due to the camera shake. The algorithm for making a correction from the obtained image data is performed by a known method.

Thus, in this embodiment, the exposure timings of the images $X_{A1}$ to $X_{B4}$ are staggered to a degree such that the sameness of the images are not lost at the time of exposure, the feature point extraction for the images $X_{A1}$ to $X_{B4}$ is performed at the time of reproduction, the change in position of the feature point is fed back to the single image to be reproduced as a camera shake to make pre-correction, whereby the amount of the camera shake can be detected without any need for a special apparatus, e.g. a camera shake sensor such as an acceleration sensor exclusively used for camera shake correction. As a result, the arrangement associated with camera shake is realized at a low cost and the camera shake is easily corrected.

Figure 18:
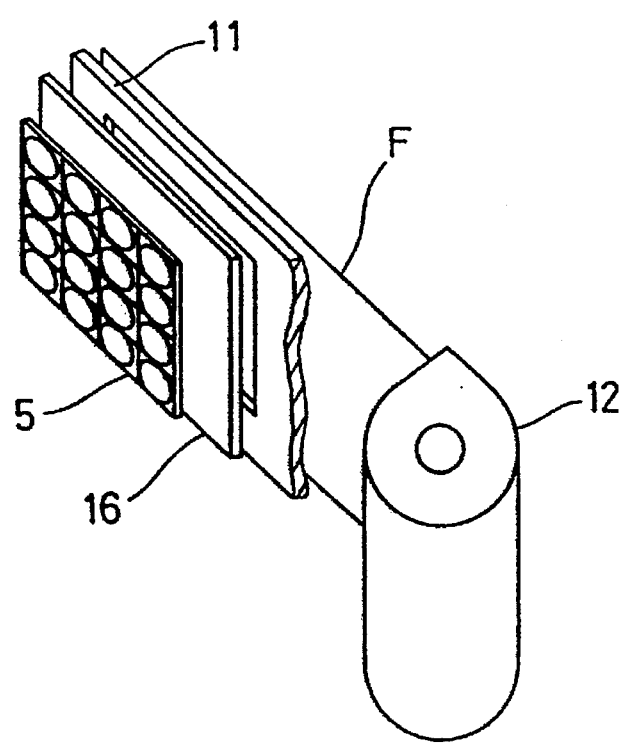
FIG. 18 is a perspective view schematically showing a relevant portion of another example of the exposure optical system provided in the camera.

In addition to the above-described method of this embodiment, the exposure at staggered exposure timings is performed by using a light transmittance controlling device such as a liquid crystal display (LCD) as shown in FIGS. 18 and 19. In this case, as shown in FIG. 18 showing an exposure optical system thereof, the exposure timings are easily staggered frame by frame by using an LCD shutter 16 as the shutter provided behind the multi-micro lens system 5. With respect to the exposure timing of the LCD shutter 16, as shown in FIGS. 19A to 19F showing a manner in sequence, the 4×4 multi-images photographed on the film F are divided into four groups which are exposed at slightly staggered exposure timing.

Specifically, when the release button 8 is depressed under a condition where light is intercepted from the film surface by the LCD shutter 16 as shown in FIG. 19A, as shown in FIG. 19B, the shutter 16 passes light through an opening corresponding to the lenses 5a in the first longitudinal row shown in FIG. 5. Then, as shown in FIG. 19C, the portion transmitting light is shifted while the opening corresponding to the lenses 5a in one longitudinal row is maintained. Subsequently, the third and fourth longitudinal rows are exposed in a similar manner as shown in FIGS. 19D and 19E. Then light is intercepted so that it does not reach the film surface as shown in FIG. 19F.

While the above-described embodiment is an image recording and reproducing system which computer-processes the data of the multi-image electrically read out by the reading unit 3 to reproduce a single image, the single image may be obtained from the photographed multi-image by an optical means.

Figure 20:
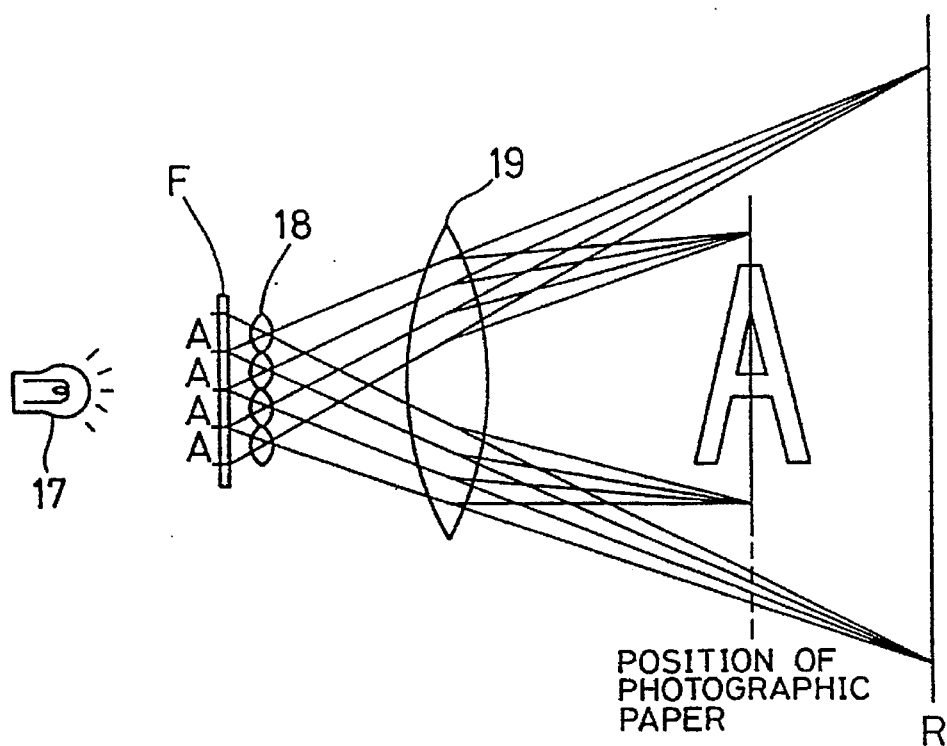
FIG. 20 schematically shows a first optical image reproducing apparatus.

Referring to FIG. 20, there is shown an example of an apparatus which uses an optical means to produce a single image from a multi-image. This apparatus has an illuminating light source 17 provided behind the film F to illuminate the film F. In front of the film F, a plurality of first printing lenses 18 is arranged which is equivalent to the multi-micro lens system 5 used at the time of exposure, i.e. which has substantially the same optical characteristics such as the number of lens elements and the focal length. In front of the first printing lenses 18, a second printing lens 19 is arranged for forming an image on the photographic paper in an appropriate size. The photographic paper is arranged at the image formed position.

In this case, the multi-image on the film F is converged into a single image by the first printing lens 18, exposed on the photographic paper by the second printing lenses 19, and then developed. The exposure and development can be performed even if the second printing lens 19 is not provided. In this case, the image formed position is retreated to a position shown at R. Thus, by exposing a single image on the photographic paper with a combination of the lenses 18 equivalent to the lens system 5 which exposes the multi-image and another printing lens 19, the image can optically be printed on the conventional photographic paper.

A problem presented in this case i a disagreement in characteristics between the multi-micro lens system 5 and the first printing lenses 18 at the time of the exposure of the film F. If the disagreement in characteristics is great, the projected images on the photographic paper naturally disaccord with one another, which results in a blurred image. As a result, the image quality deteriorates. To solve this problem, the multi-micro lens system 5 used for the exposure of the film F can be also used as the first printing lens 18.

As a way to realize the diversion of the lens, like the currently spreading film having a lens, film and a lens system are sold as a set and recovered, and the printing is performed with the recovered lens system. Thus, by exposing a single image on the photographic paper with a combination of the lens used for the exposure of the multi-image and the printing lens, the occurrence of errors due to non-uniformity of lenses between exposure and printing is avoided.

Figure 21:
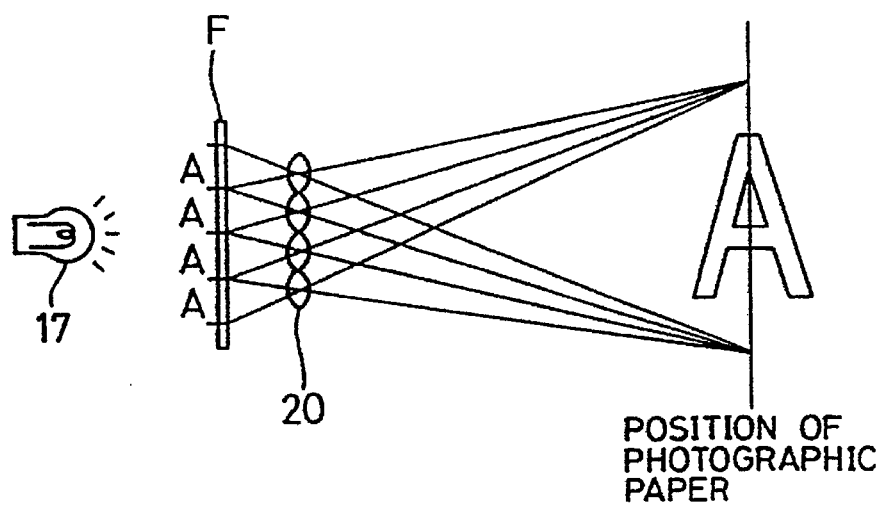
FIG. 21 schematically shows a second optical image reproducing apparatus.

As another optical means used for producing a single image from a multi-image, for example as shown in FIG. 21, a multi-micro lens system 20 of characteristics different from those of the lens system used for the exposure of the film F may be used for printing instead of the second printing lens 19. In this case, since the exposure of a single image on the photographic paper is performed by using the same number of printing lenses as that of the lenses used for the exposure of the multi-image, the number of printing lenses decreases. As a result, the cost is reduced.

Thus, by using the optical reproducing apparatuses shown in FIGS. 20 and 21, the images on the film F are averaged on the photographic paper to cancel the graininess of the film F. As a result, a single image of high quality is obtained.

As described above, according to the present invention, the length of the optical system is greatly reduced by dividing each of the frames of the same size to decrease the size of each image. As a result, a camera with a thickness of 5 mm to 10 mm is realized.

Further, the multi-image on the film is electrically read out to reproduce a single image and the reproduced image can be outputted through a monitor and a printer, so that a clear image is reproduced irrespective of the graininess of the film. Moreover, the reproduced image can be printed onto the photographic paper. In this case, since the average data of the multi-image has already been obtained, no printing lens is necessary.

Obviously, many modifications and variations of the present invention are possible in light of the above teachings. It is therefore to be understood that within the scope of the appended claims, the invention may be practiced other than as specifically described.

What is claimed is:

1. An image recording and reproducing system comprising:
   a recording device, which records an image of an object on a recording medium, including:
   a plurality of taking lenses, each of said plurality of taking lenses having the same field of view and taking the same objective field as the others of said plurality of taking lenses, wherein a plurality of images taken by said plurality of taking lenses are recorded on the recording medium; and
   a reproducing device, which reproduces a picture of the object based on the plurality of images recorded on the recording medium, including:
   pick up means for picking up the plurality of images recorded on the recording medium; and converting means for converting the plurality of images picked up by said pick up means into a picture of the object to be reproduced.

2. The image recording and reproducing system according to claim 1, wherein said plurality of taking lenses are disposed in a plane perpendicular to an optical axis of the plurality of taking lenses.

3. The image recording and reproducing system according to claim 1, wherein said plurality of taking lenses are disposed in the form of a matrix.

4. The image recording and reproducing system according to claim 1, wherein said recording medium is a photographing film and said plurality of images recorded on the recording medium are recorded within a single frame of said photographing film.

5. The image recording and reproducing system according to claim 1, wherein said converting means includes averaging means for averaging the plurality of images picked up by said pick up means.

6. An image recording apparatus comprising:

a plurality of taking lenses disposed in the form of a matrix, each of said plurality of taking lenses having the same field of view and taking the same objective field as the others of said plurality of taking lenses; and recording means for recording a plurality of images formed by said plurality of taking lenses on a recording medium, wherein the recorded plurality of images are to be converted into a picture of an object by an image reproducing apparatus.

7. The image recording apparatus according to claim 6, wherein said recording medium is a photographing film and the thus recorded plurality of images are recorded within a single frame of said photographing film.

8. An image reproducing apparatus, which reproduces a picture of an object based on a plurality of images recorded on a recording medium, comprising:

pick up means for picking up the plurality of images recorded on the recording medium, wherein each of the plurality of images is of the same objective field as the others of said plurality of images; and converting means for converting the plurality of images picked up by said pick up means into a picture of the object to be reproduced.

9. The image reproducing apparatus according to claim 8, wherein said recording medium is a photographing film and said plurality of images recorded on the recording medium are recorded within a single frame of said photographing film.

10. The image reproducing apparatus according to claim 8, wherein said converting means includes averaging means for averaging the plurality of images picked up by said pick up means.

11. An imaging system comprising:

a plurality of lenses which form a plurality of images on a predetermined plane;

an image receiving device which is located on the predetermined plane, said image receiving device receiving and holding the plurality of images formed by the plurality of lenses; and a converting device which picks up the plurality of images held by the image receiving device and converts the picked up plurality of images into one image.

12. The imaging system according to claim 11, wherein each of said plurality of lenses has the same field of view and takes the same objective field as the others of said plurality of lenses.

13. The imaging system according to claim 11, wherein the image receiving device is a photographing film and the plurality of images received by said image receiving device are exposed within a single frame of said photographing film for holding.

14. The imaging system according to claim 13, wherein the converting device has a lens which picks up the plurality of images held by the image receiving device and a sensor which converts the picked up plurality of images into one image.

15. The imaging system according to claim 11, wherein the plurality of lenses and the receiving device are provided within a camera, and the converting device is provided within an apparatus different from the camera.

16. An imaging system comprising:

a plurality of lenses which form a plurality of images on a predetermined plane; and an image receiving device which is located on the predetermined plane, said image receiving device receiving and holding the plurality of images formed by the plurality of lenses for being picked up and converted into one image.

17. The imaging system according to claim 16, wherein each of the plurality of lenses has the same field of view and takes the same objective field as the others of said plurality of lenses.

18. The imaging system according to claim 16, wherein the image receiving device is a photographing film and the plurality of images received by said image receiving device are exposed within a single frame of said photographing film for holding.

* * * * *

UNITED STATES PATENT AND TRADEMARK OFFICE
CERTIFICATE OF CORRECTION

PATENT NO. : 5,649,250
DATED : July 15, 1997
INVENTOR(S) : Sasaki

It is certified that error appears in the above-indentified patent and that said Letters Patent is hereby corrected as shown below:

Column 9, claim 6, lines 24-26, delete "recording means for recording a plurality of images formed by said plurality of taking lenses on a recording medium, wherein the recorded plurality of images are" and insert --a recording medium for recording a plurality of images formed thereon by said plurality of taking lenses, wherein the recorded plurality of images are--.

Signed and Sealed this

Fourteenth Day of July, 1998

Attest:

BRUCE LEHMAN

Attesting Officer     Commissioner of Patents and Trademarks